(12) United States Patent
Hahn

(10) Patent No.: US 6,222,462 B1
(45) Date of Patent: Apr. 24, 2001

(54) METHOD AND APPARATUS FOR WARNING DRIVERS AS TO THE PRESENCE OF CONCEALED HAZARDS

(76) Inventor: Robin Hahn, Box 195, Hay Lakes, Alberta (CA), T0B 1W0

(*) Notice: Subject to any disclaimer, the term of this patent is extended or adjusted under 35 U.S.C. 154(b) by 0 days.

(21) Appl. No.: 09/311,757

(22) Filed: May 13, 1999

(30) Foreign Application Priority Data

Jun. 8, 1998 (CA) .................................................. 2239849

(51) Int. Cl.[7] .............................. G08G 1/00; B60Q 1/26
(52) U.S. Cl. ........................ 340/904; 340/908; 340/905; 340/994; 340/433
(58) Field of Search .................................. 340/904, 905, 340/901, 539, 433, 993, 994, 908

(56) References Cited

U.S. PATENT DOCUMENTS

| | | | |
|---|---|---|---|
| 3,257,641 | * 6/1966 | Campana et al. | 340/904 |
| 4,325,057 | 4/1982 | Bishop | 340/539 |
| 4,736,186 | * 4/1988 | Pichey | 340/904 |
| 5,345,232 | * 9/1994 | Robertson | 340/906 |
| 5,986,576 | * 11/1999 | Armstrong | 340/908 |

* cited by examiner

Primary Examiner—Donnie L. Crosland
(74) Attorney, Agent, or Firm—Christensen O'Connor Johnson Kindness PLLC

(57) ABSTRACT

A method and apparatus for warning drivers as to the presence of a concealed hazard. A first step involves providing a sign capable of changing from an inactive mode to a warning mode upon receiving a signal. A second step involves providing a transmitter compatible with the signs receiver. A third step involves positioning the sign at a location along a highway that is visible a sufficient distance from the concealed hazard to provide warning to drivers of approaching vehicles. Where the concealed hazard is a concealed school bus stopping location, it is preferred that the transmitter be positioned in a school bus so as to enable a driver of the school bus to remotely change the sign from the inactive mode to the warning mode as the school bus approaches the concealed stopping location.

2 Claims, 5 Drawing Sheets

METHOD AND APPARATUS FOR WARNING DRIVERS AS TO THE PRESENCE OF CONCEALED HAZARDS

FIELD OF THE INVENTION

The present invention relates to a method and an apparatus for warning drivers as to the presence of concealed hazards and, in particular, a school bus in the process of loading or unloading a passenger at a concealed stopping location.

BACKGROUND OF THE INVENTION

School buses stop at pick-up/drop-off locations to allow child(ren) to be picked up and dropped off. Drivers of motor vehicles and other road users must be prepared to stop in good time to ensure the safety of the child(ren) in the vicinity of the stopped bus and other road users. Every school bus has warning lights that are visible at a distance to warn drivers of the presence of the bus and allow the drivers a reasonable opportunity to slow down. It is vital that drivers receive the warning in a timely fashion, as it takes a considerable distance for a motor vehicle to come to a complete stop when it is travelling at highway speeds such as 100 kilometers per hour. Unfortunately, some pick-up and drop-off locations on school bus routes are unavoidably positioned such that the school bus is concealed from view due to an obstruction such as tall vegetation, walls, buildings, billboards, a hill or a bend in the highway. At such locations there is a risk of a tragic accident occurring, for by the time the school bus is visible to the driver of an oncoming motor vehicle there is insufficient time for the driver to bring his motor vehicle to a stop.

SUMMARY OF THE INVENTION

What is required at such locations is an apparatus for warning drivers of approaching motor vehicles as to the presence of a concealed hazard.

According one aspect of the present invention there is provided an apparatus for warning drivers of approaching motor vehicles as to the presence of a concealed hazard, including a sign adapted for installation along a highway. The sign has a switch to turn the sign from an inactive mode to a warning mode. The sign is normally in the inactive mode. Signal receiving means are provided on the sign which activate the switch to change the sign from the inactive mode to the warning mode upon receiving a signal. Means is provided for sending a signal to the signal receiving means to remotely change the sign from the inactive mode to the warning mode.

According to another aspect of the invention there is provided a method for warning drivers as to the presence of a concealed hazard. A first step involves providing a sign adapted for installation along a highway. The sign has a switch to turn the sign from an inactive mode to a warning mode. The sign is normally in the inactive mode, the sign having signal receiving means which activate the switch to change the sign from the inactive mode to the warning mode upon receiving a signal. A second step involves providing means for sending a signal to the signal receiving means to remotely change the sign from the inactive mode to the warning mode. A third step involves positioning the sign at a location along a highway that is visible a sufficient distance from a concealed hazard to provide drivers of approaching motor vehicles warning as to the presence of the concealed hazard in sufficient time to enable such drivers to stop their motor vehicles in safety.

The teachings of the present method has application to a number of applications. The particular application that the present method and apparatus was developed for was the unloading of a school bus. Although beneficial results may be obtained through the use of the method, as described above, even more beneficial results may be obtained when a fourth step is taken of positioning the means for sending a signal to remotely change the sign in a school bus so as to enable a driver of the school bus to remotely change the sign from the inactive mode to the warning mode prior to the school bus stopping and while the school bus is stopped at the concealed location. This enables a transmitter having only a limited range to be used for activating the sign to move from the inactive mode to the warning mode, because the school bus must drive past the sign. However, when changing the sign back from the warning mode to the inactive mode, the school bus is at a considerable distance from the sign. This requires a considerably more powerful and, consequently, a considerably more expensive transmitter. Even more beneficial results may, therefore, be obtained when a timer is provided to change the sign from the warning mode back to the inactive mode after passage of a predetermined time interval. It is desirable for the operator of the school bus to be certain that the sign has received the signal to change the sign from inactive mode to warning mode. Therefore, optionally the signal receiver on the sign and the transmitter on the bus each can be replaced with a transmitter/receiver so that, when the sign has changed from inactive mode to warning mode, the sign emits a signal which is received by the transmitter/receiver in the school bus to so inform the operator of the school bus.

Optionally two copies of the apparatus may be used for signs placed along the highway on each side of the stopping location, and these two signs may be connected electronically or by means of a radio signal so that they may be operated together to warn drivers of motor vehicles approaching the stopping location from both directions.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
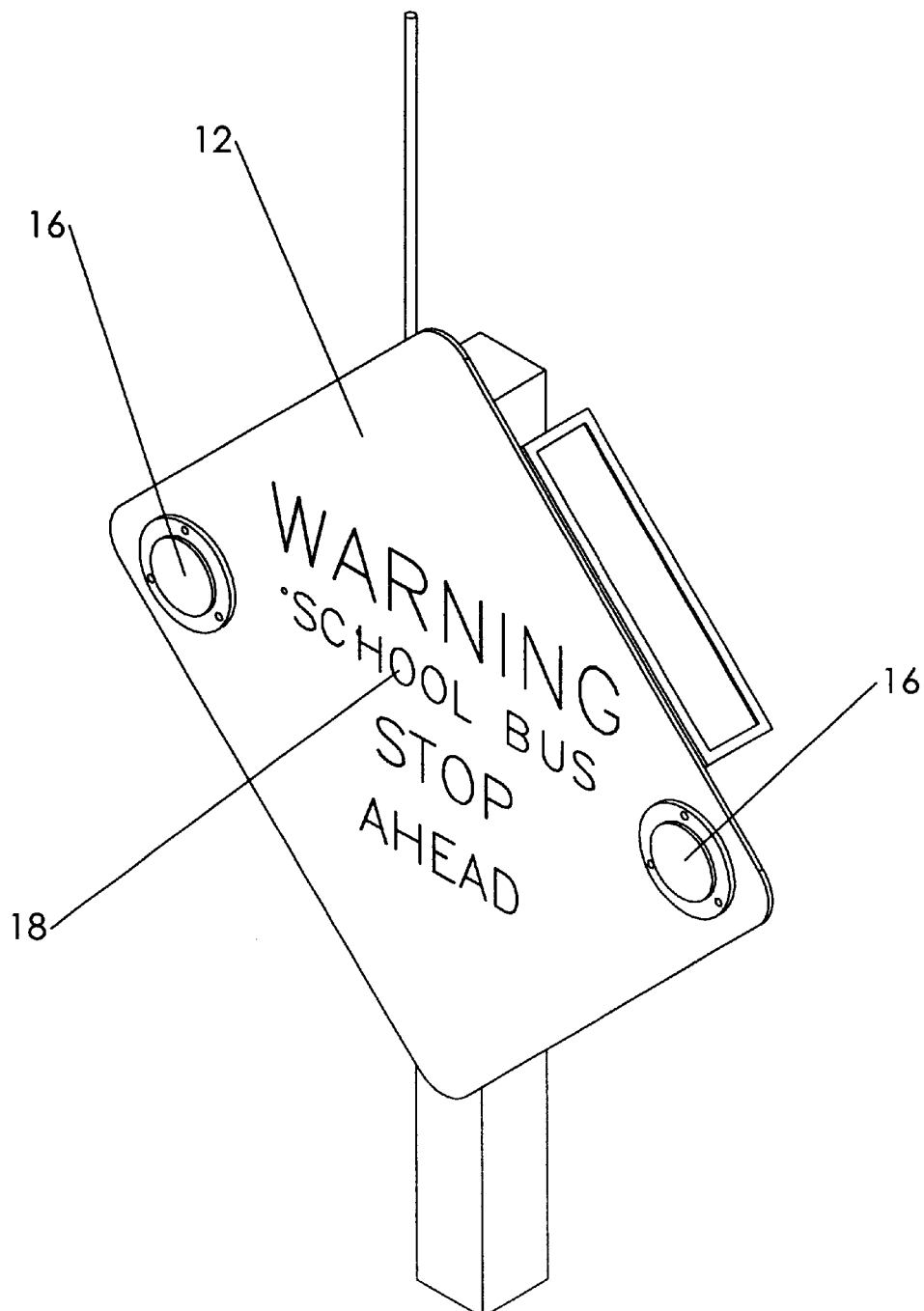
FIG. 1 is a front elevation view of a warning sign constructed in accordance with the teachings of the present invention.

The preferred embodiment, an apparatus for warning drivers as to the presence of a concealed hazard, generally identified by reference numeral 10, will now be described with reference to FIGS. 1 through 5.

Referring to FIG. 1, apparatus 10 includes a sign 12 adapted for installation along a highway 44 in combination with a receiver 14 mounted on the rear of the sign 12 or in close proximity to the sign 12. The front of the sign 12 is placed so as face oncoming road traffic and includes warning lights 16 which are illuminated and flash when the sign 12 is in the warning mode, the sign 12 being normally in the inactive mode, and the required wording 18 of the warning. The warning lights 16 will be of sufficient size and luminosity for the intended purpose of drawing the attention of drivers of oncoming vehicles to the sign 12, such as 4 inch diameter light emitting diode arrays. The wording 18 of the warning will be determined by the requirements of the jurisdiction within which the sign 12 is placed and will typically include the word WARNING in red, the words SCHOOL BUS in black, the word STOP in red and the word AHEAD in black.

Figure 2:
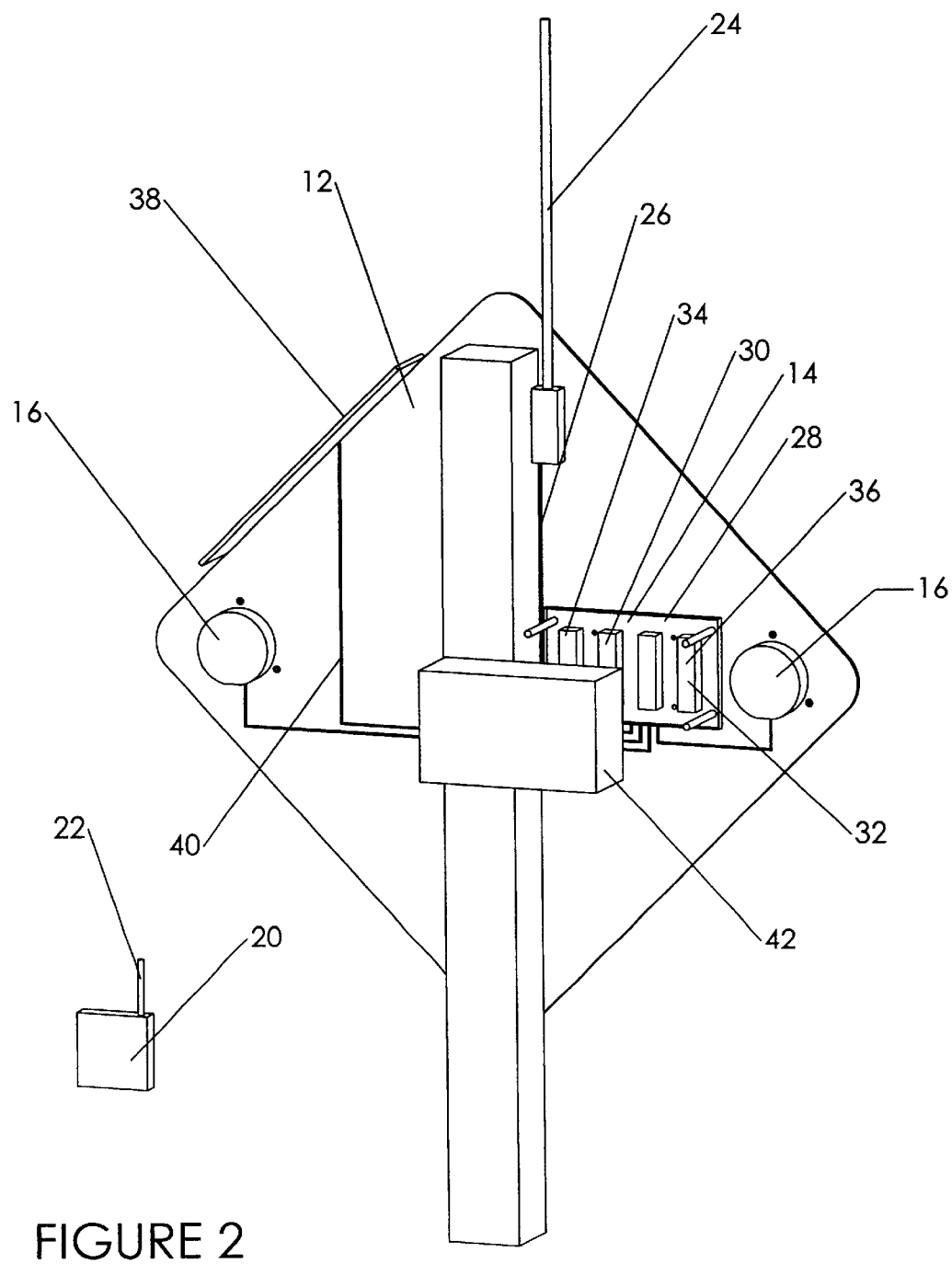
FIG. 2 is a rear elevation view of the warning sign illustrated in FIG. 1.

Referring to FIG. 2, the signal to activate the sign 12 is transmitted by the transmitter 20 located in the school bus 21 by means of the antenna 22 on the school bus 21. The signal is received by the antenna 24 on the sign 12 and carried by electrical wiring 26 to the receiver 14. The receiver 14 is connected electronically to electronic circuitry 28 into which is integrated a switch 30 which turns the sign 12 from an inactive mode to a warning mode and from a warning mode to an inactive mode. Also integrated into the electronic circuitry 28 is means 32 for making the warning lights 16 flash at a predetermined frequency upon receiving a signal. Optionally a timer 34 is coupled with the switch 30 to activate the switch 30 to change the sign 12 from the warning mode back to the inactive mode after passage of a predetermined time interval.

The apparatus 10 is powered electrically. The source of the electrical power may be an accessible commercial utility system or a dedicated power supply unit. Optionally the power source may be a rechargeable battery 36. Beneficially the rechargeable battery 36 may be recharged from a solar panel 38 connected permanently by electrical wiring 40 to the rechargeable battery 36.

The apparatus 10 is necessarily placed in outdoor locations and consequently is exposed to all weather conditions revailing at the site, including precipitation and intense sunlight, and dust and debris arising from the road traffic and the surrounding environment. It is therefore necessary that he electronic circuitry 28, the switch 30, the means 30 for making the warning lights 16 flash, the optional timer 34, and the optional rechargeable battery 36 be enclosed within a protective housing 42 to protect these electronic components from the effects of weather, sunlight, dust and other detrimental factors.

Figure 3:
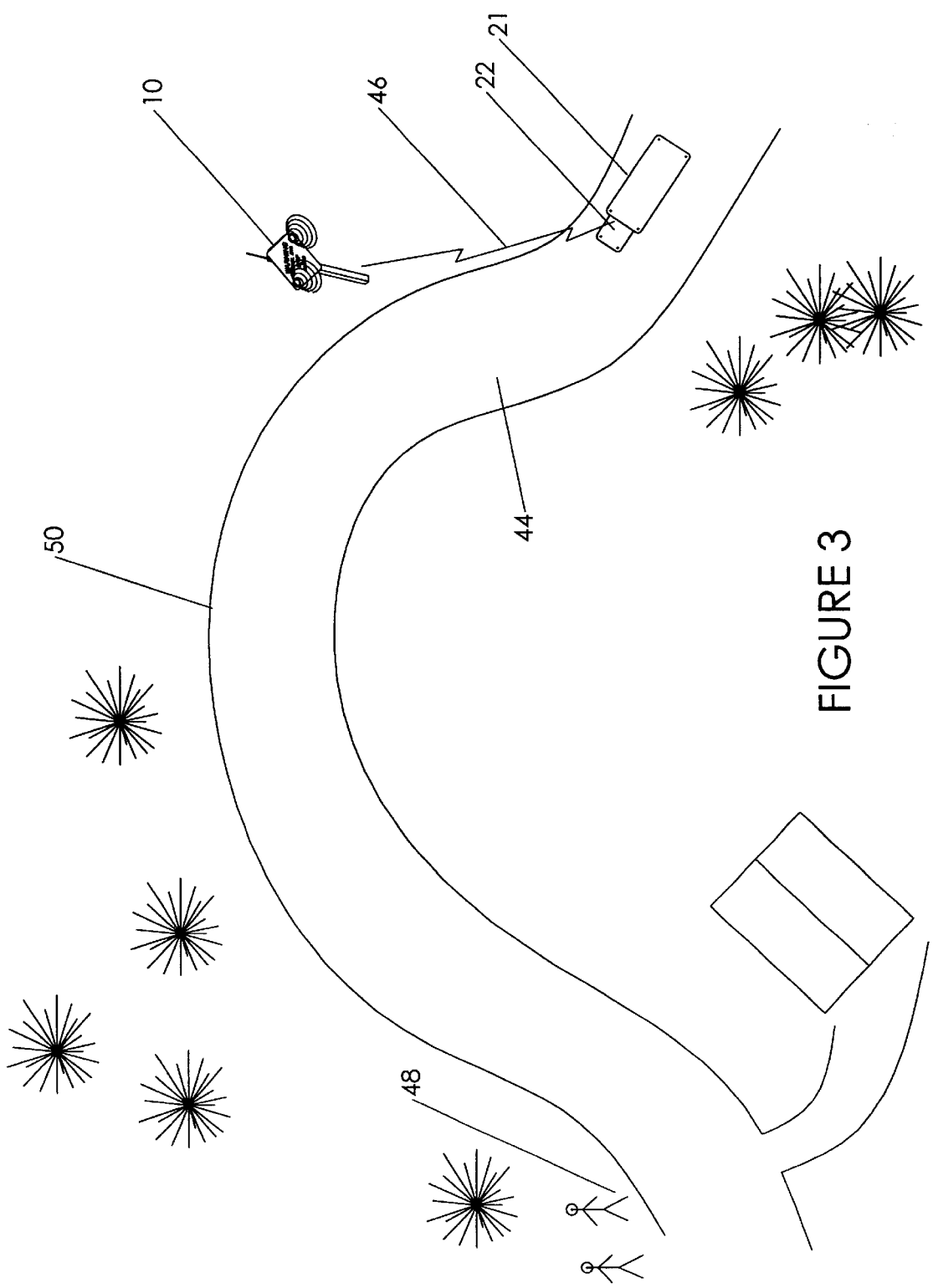
FIG. 3 is a top plan view of the warning sign as illustrated in FIG. 1, installed to give warning of a concealed hazard in accordance with the teachings of the present invention, with a school bus proceeding past the warning sign to a concealed stopping location.

The use and operation of apparatus 10 will now be described in relation to a preferred method. With reference to FIG. 3, a method is provided for warning drivers as to the presence of a concealed hazard, in this case the concealed hazard illustrated is a school bus 21 in the process of loading or unloading one or more passengers. A sign 12 is installed along a highway 44. The sign 12 has a switch 30 to turn the sign 12 from an inactive mode to a warning mode and from the warning mode to the inactive mode. Warning lights 16 are illuminated and flash when the sign 12 is in the warning mode. The sign 12 being normally in the inactive mode. A receiver 14 activates a switch 30 to change the sign 12 from the inactive mode to the warning mode upon receiving a signal. A transmitter 20 located in a school bus 21 and connected to an antenna 22 for sending a signal from the school bus 21 to the receiver 14 to remotely change the sign 12 from the inactive mode to the warning mode by means of a radio signal as indicated by the arrow designated by the reference number 46.

The transmitter 20 located in the school bus 21 enables a driver of the school bus 21 to remotely change the sign 12 from the inactive mode to the warning mode prior to the school bus 21 stopping and while the school bus 21 is stopped at the concealed location 48. The transmitter 20 may also be used to enable the driver of the school bus 21 to remotely change the sign 12 from the warning mode to the inactive mode after the school bus 21 has departed from the stopping location 48.

Optionally two of the apparatus 10 may be used for signs 12 placed along the highway 44 on each side of the stopping location 48, and these two signs 12 may be connected electronically or by means of a radio signal so that they may be operated together to warn drivers of motor vehicles 52 approaching the stopping location 48 from either or both directions.

Figure 4:
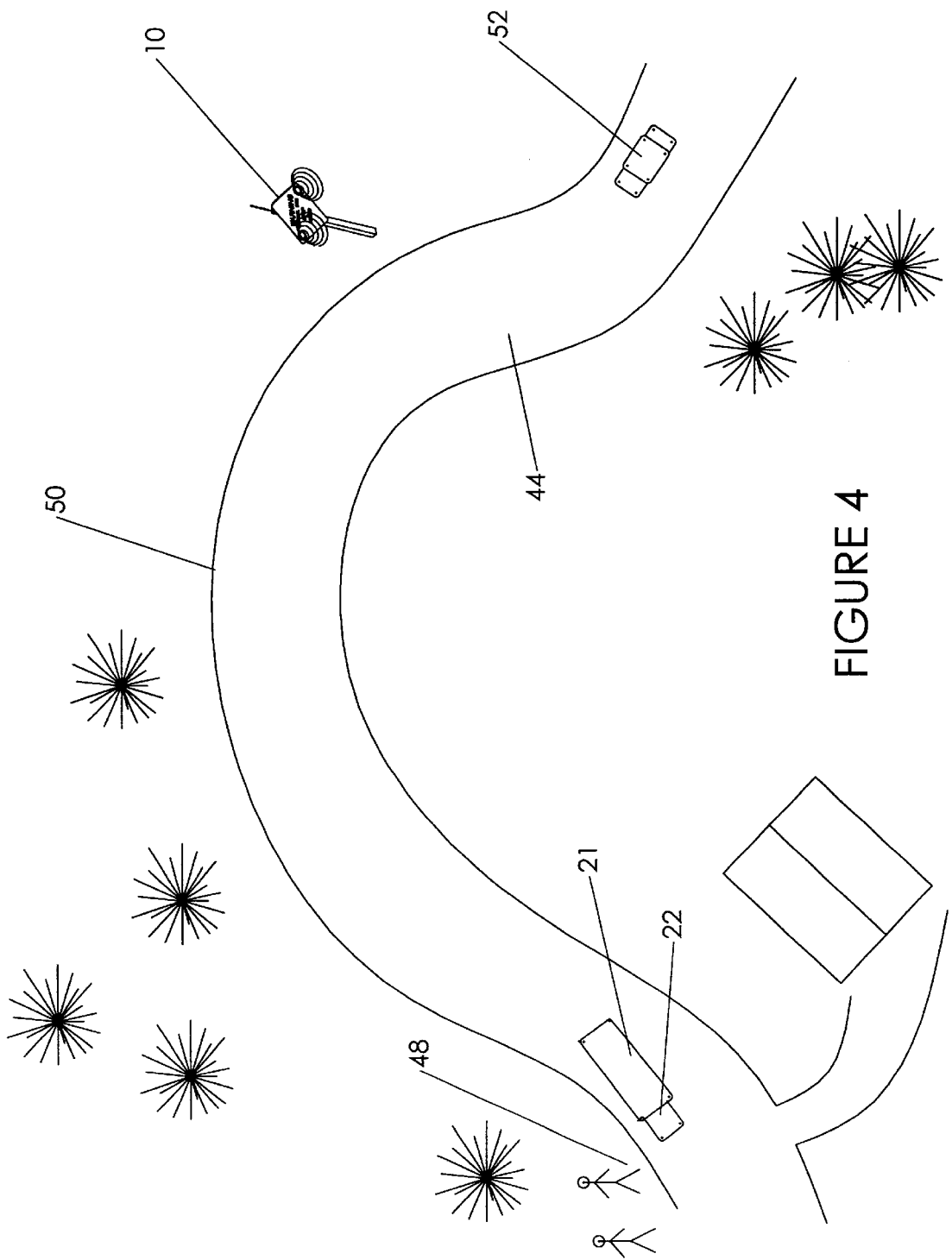
FIG. 4 is a top plan view of the warning sign, as illustrated in FIG. 1, installed to give warning of a concealed hazard in accordance with the teachings of the present invention, with the school bus stopped at the concealed stopping location.

With reference to FIG. 4, the sign 12 is located at a position shown by the reference number 50 along a highway such that it is visible a sufficient distance from a concealed stopping location 48 to provide drivers of approaching motor vehicles 52 warning as to the presence of a school bus 21 at the concealed location 48.

Figure 5:
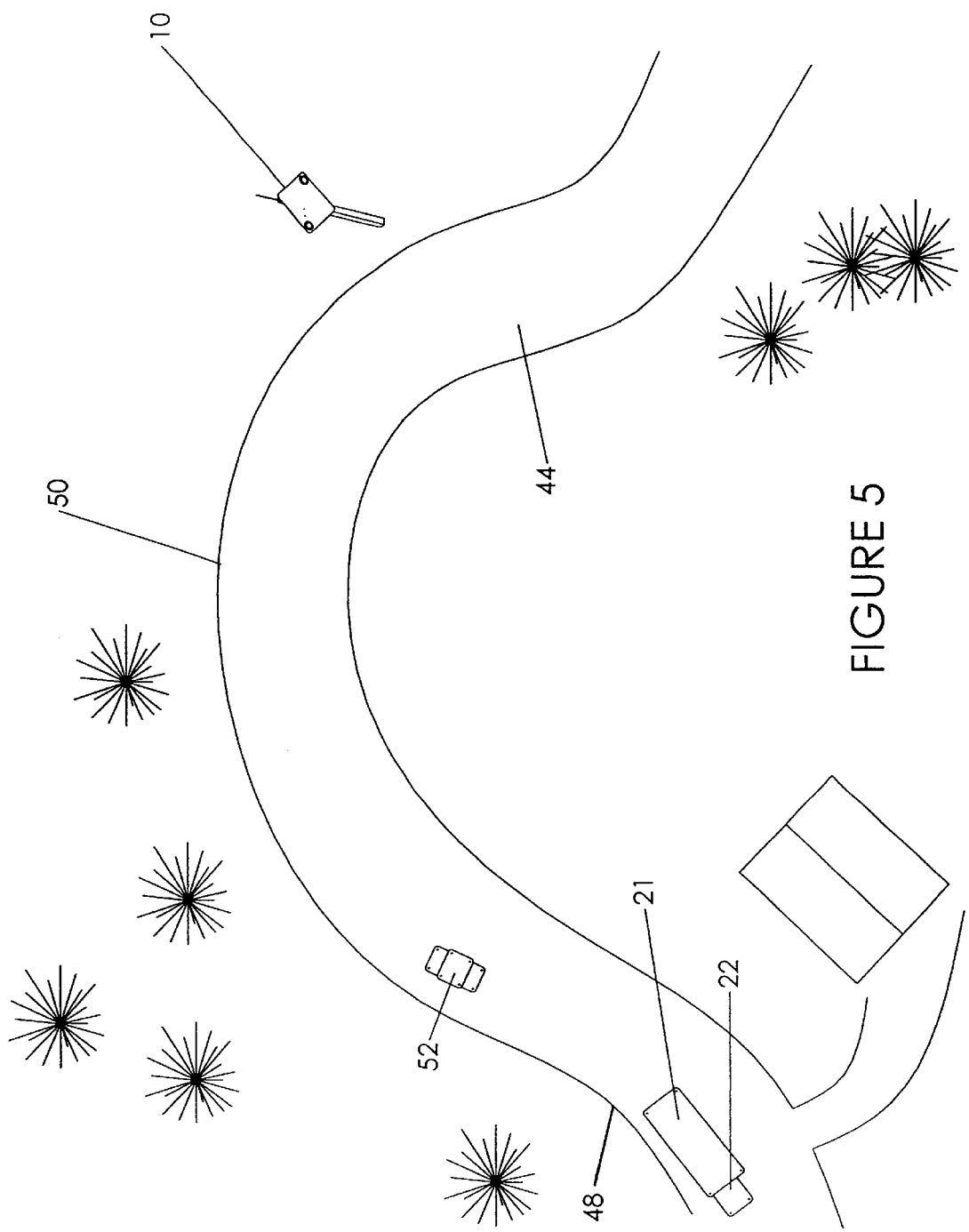
FIG. 5 is a top plan view of the warning sign, as illustrated in FIG. 1, installed to give warning of a concealed hazard in accordance with the teachings of the present invention, with the school bus leaving the concealed stopping location.

With reference to FIG. 5, the drivers of approaching motor vehicles 52 will thereby have sufficient time to stop the motor vehicles 52 in safety until the school bus 21 leaves the stopping location 48. Once the children have been safely picked up or have alighted from the school bus 21 and the school bus 21 departs the stopping location 48; the operator of the school bus 21 can change the sign 12 from warning mode to inactive mode by remote control using the transmitter 20. Optionally a timer 34 is provided to change the sign 12 from the warning mode back to the inactive mode after passage of a predetermined time interval.

It will be apparent to one skilled in the art that modifications may be made to the illustrated embodiment without departing from the spirit and scope of the invention as hereinafter defined in the Claims. It will also be apparent that although a school bus is used as an example, there are other concealed hazards that arise; such as logging trucks entering a highway or highway maintenance vehicles. It will finally be apparent that the highway or other roadway as described in the above description may be used by both motor vehicles and other forms of transport such as bicycles, that the term driver can be used to describe the operator of a motor vehicle or other road user and that the term motor vehicle as used in the preceding description can be used to describe all vehicles using the highway or other roadway.

The embodiments of the invention in which an exclusive property or privilege is claimed are defined as follows:

1. A method for warning drivers as to the presence of a school bus in the process of unloading a passenger, comprising the steps of:

providing a sign adapted for installation along a highway, the sign having a switch to turn the sign from an inactive mode to a warning mode, the sign has warning lights which are illuminated and flash when the sign is in the warning mode, the sign being normally in the inactive mode, the sign having a receiver which activates the switch to change the sign from the inactive mode to the warning mode upon receiving a signal;

providing a transmitter for sending a signal to the receiver to remotely change the sign from the inactive mode to the warning mode;

positioning the sign at a location along a highway that is visible a sufficient distance from a concealed stopping location to provide drivers of approaching motor vehicles warning as to the presence of a school bus at the concealed stopping location in sufficient time to enable such drivers to stop their motor vehicles in safety; and positioning the transmitter in a school bus so as to enable a driver of the school bus to remotely change the sign from the inactive mode to the warning mode while the school bus is stopped at the concealed location.

2. The method as defined in claim 1, wherein a timer is provided to change the sign from the warning mode back to the inactive mode after passage of a predetermined time interval.

\* \* \* \* \*